Figure 1:
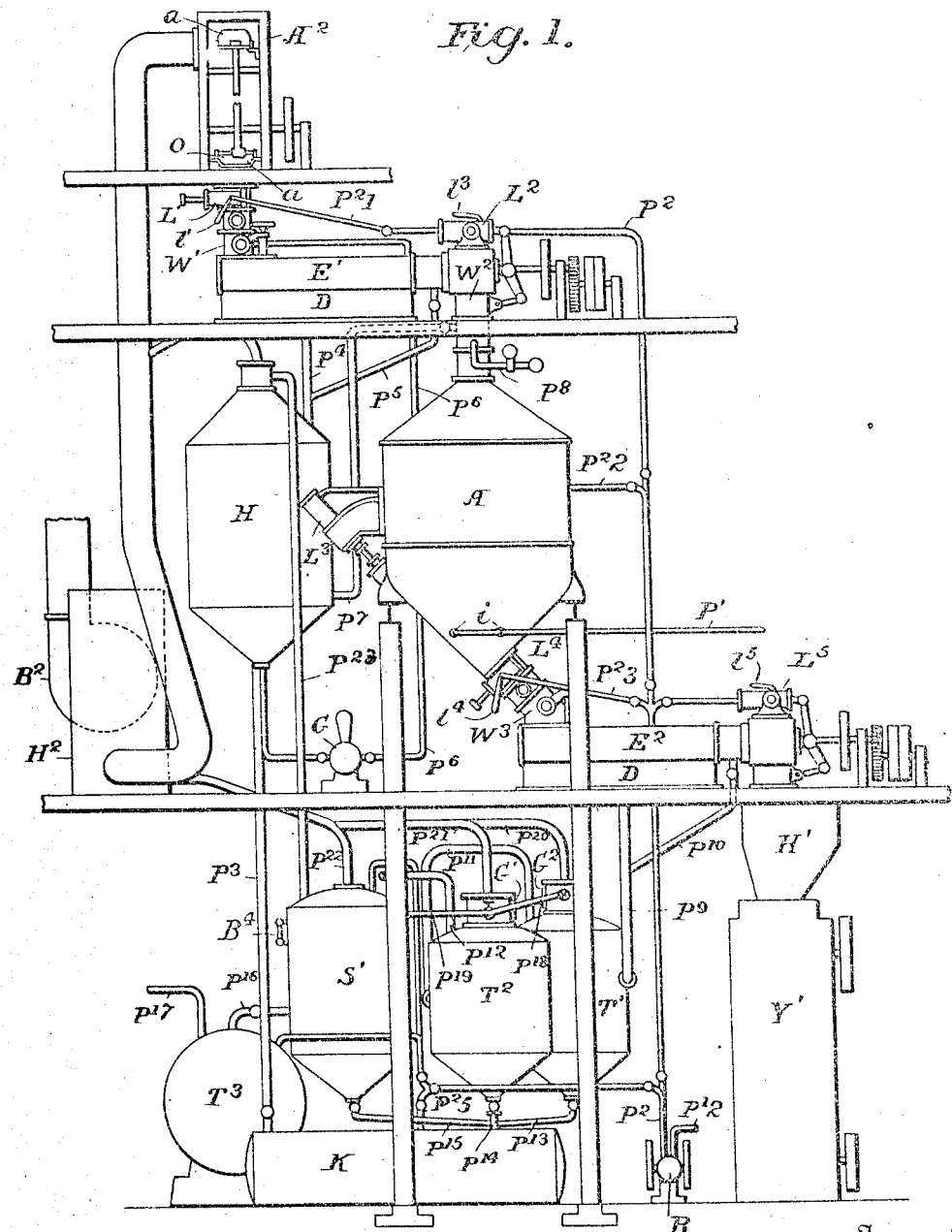

C. S. WHEELWRIGHT.
PROCESS OF EXTRACTING GREASE AND OIL FROM GARBAGE.
APPLICATION FILED OCT. 3, 1908.

925,971.

Patented June 22, 1909.
5 SHEETS—SHEET 1.

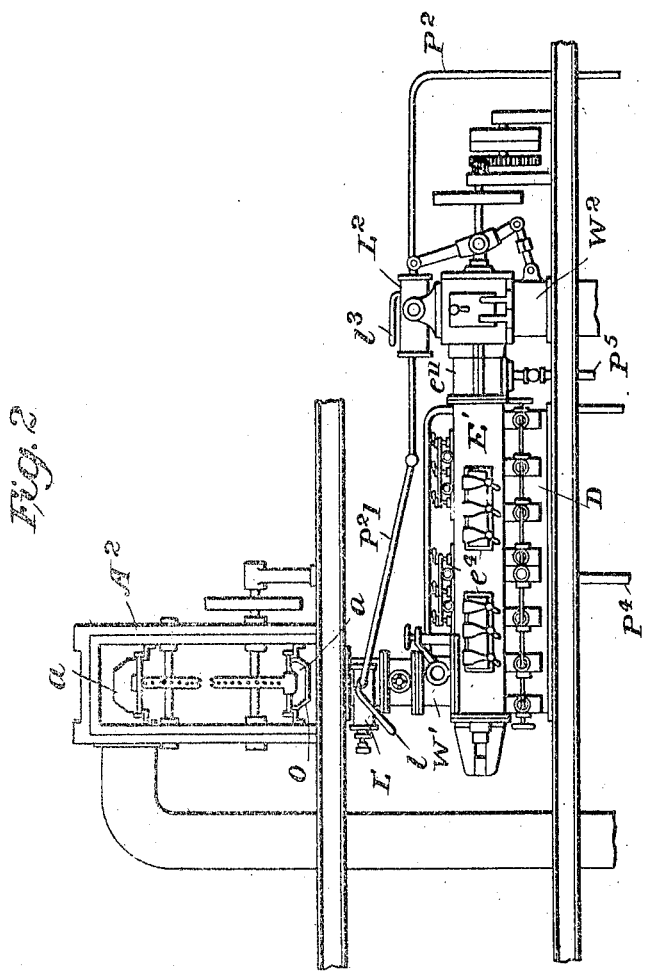

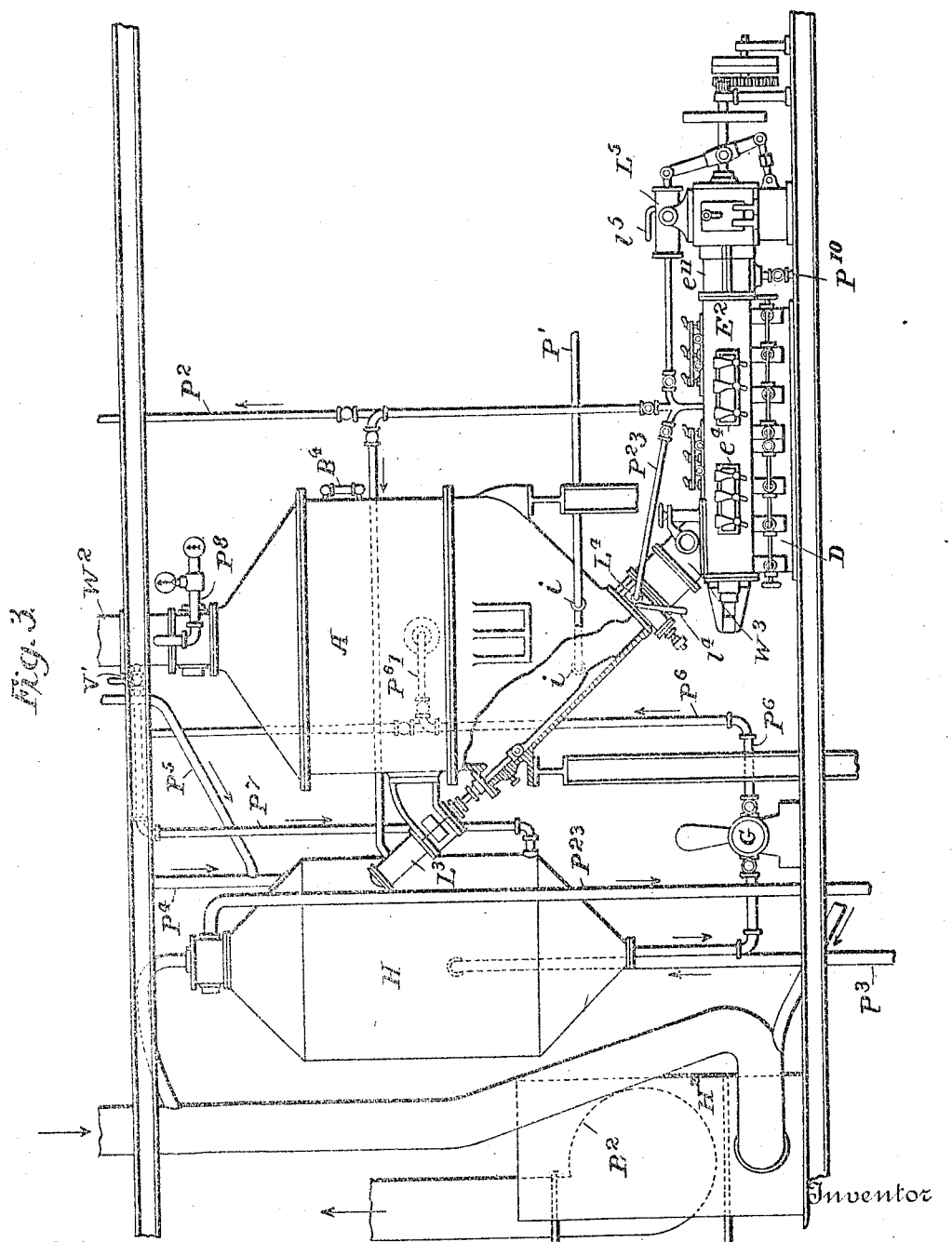

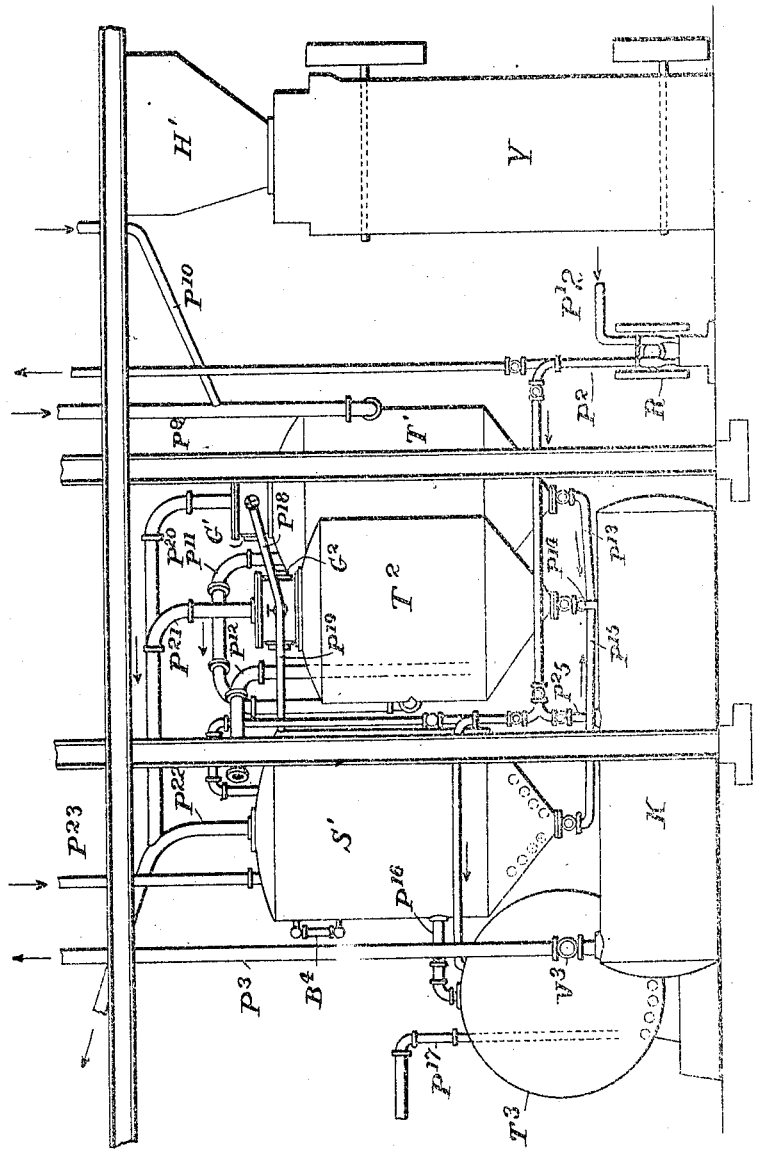

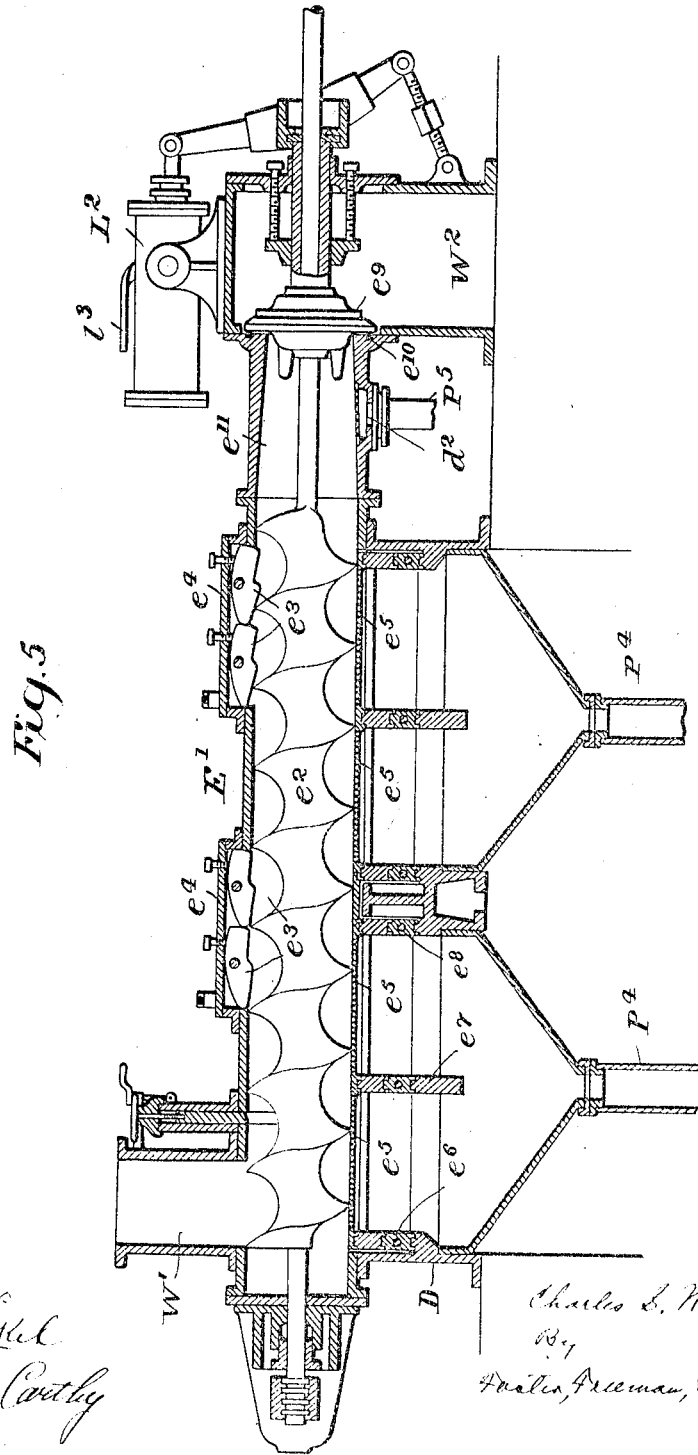

UNITED STATES PATENT OFFICE.

CHARLES S. WHEELWRIGHT, OF BRISTOL, RHODE ISLAND.

PROCESS OF EXTRACTING GREASE AND OIL FROM GARBAGE.

No. 925,971.  Specification of Letters Patent.  Patented June 22, 1909.

Application filed October 3, 1908. Serial No. 455,978.

*To all whom it may concern:*

Be it known that I, CHARLES S. WHEELWRIGHT, a citizen of the United States, residing at Bristol, in the county of Bristol and State of Rhode Island, have invented certain new and useful Improvements in Processes of Extracting Grease and Oil from Garbage, of which the following is a specification.

The primary object of the invention is the continuous operation of the process of extracting grease or oil from garbage, the said process consisting in continuously saturating the garbage with hot water and draining the hot water therefrom continuously forcing the garbage through the vessel in which it is so saturated and drained in a hot condition into a cooking vessel while said cooking vessel is under steam pressure, continuously adding hot water to said garbage in said cooking vessel and cooking said garbage therein under steam pressure, continuously removing the garbage in a cooked condition and oil and water therewith from said cooking vessel and thereafter separating the oil and water from the cooked garbage and the oil from the water.

The invention is, however, adapted for use in a rendering plant and for other uses.

The invention consists also in that detail of said continuous process that lies in the preparation of the garbage for further treatment in a digester under steam pressure, the same consisting in continuously saturating the garbage with hot water, draining the hot water from the garbage and forcing the garbage so saturated and drained in a hot condition into said digester under steam pressure.

The several parts of the apparatus by which the said process is conducted are old, sists mainly of a steam cooking vessel or diparts being required. Such apparatus consists mainly of a steam cooking vessel or digester, a hot water tank, extractors, the construction and mode of operation of which are fully described in my Patents No. 783,602 dated February 28, 1905, and No. 890,112 dated June 9, 1908, steam and compressed air pipes, trap tanks, air compressors, vapor condensers and pumps, a separator and a swill or muck tank, the offices of all of which not fully apparent from their names will be described.

In the drawings:—Figure 1 shows a general view of the apparatus as set up on three floors and a gallery of the building in which it is installed; Fig. 2 represents so much of the apparatus as is on the third floor and a gallery of the building; Fig. 3, represents so much of the apparatus as is on the second floor, with parts taken from Fig. 1 and Fig. 4; Fig. 4 represents so much of the apparatus as is on the ground floor; Fig. 5 is a longitudinal cross section of an extractor.

A is the cooking vessel or digester, which it is unnecessary to describe further than to say, that it is made in sections with conical ends at top and bottom, and, as is the case with the other parts of apparatus used in this process, is air and water tight.

P' is a pipe through which direct steam from a boiler system not shown is admitted to the digester for cooking purposes by entrance pipes $i$ $i$ in a ring pipe surrounding the lower cone of the digester and connected with said pipe P'. (See my Patent No. 774,804, dated Nov. 15, 1904.)

E' is an extractor, in this instance used for forcing garbage into the digester or cooking vessel, the said digester at the time being under steam pressure. The said extractor E' is connected with the digester by a passageway $W^2$ leading from the end of the extractor to the dome of the digester which is made in sections as shown.

Uncooked garbage under pressure gives up but a small percentage of grease or oil; consequently no attempt is made to extract oil from garbage in extractor E' but hot water is pumped by a pump G from hot water tank H, into a passageway W' through which raw garbage descends to extractor E' as will be described to assist the passage of garbage through the extractor and aid in forming a plug of garbage as will appear. The said extractor E' is fully described in my Patents, No. 783,602 dated February 28, 1905, and No. 890,112 dated June 9, 1908, but may be briefly described as consisting of a long horizontal cylinder with a carrying screw $e^2$ closely fitting the inner periphery of the cylinder, turned by belting from the main power shaft of the apparatus as indicated in the drawings. The said carrying screw in carrying material from one end to the other of said cylinder is aided by metal plates or fins, $e^3$, pivoted in boxes $e^4$ set in said cylinder, and by water introduced as hereafter described and drain plates $e^5$ set along the bottom of the cylinder, the said drain plates resting on and being supported by inclined blocks $e^6$ and $e^7$ within a water tight bed D along the top of which the cylinder rests and in the top of which the said drain plates are placed. The said inclined blocks are operated by screws connected by suitable gearing with a shaft $e^8$ on the outside of said bed D. The said cylinder is furnished with a plug valve $e^9$ which is operated to and from its seat $e^{10}$ by a lever under control of the piston of cylinder $L^2$. A packing channel $e^{11}$ just in front of the plug valve $e^9$ of decreasing diameter from the screw insures the formation of a plug of garbage or other material against said plug valve when the same is on its seat, after which, while the cylinder screw $e^2$ is in operation, the plug valve $e^9$ is more or less opened and the plug of garbage or other material, more or less disintegrated, by knives carried by the said valve $e^9$ which by a clutch mechanism fully described in my Patent No. 890,112, about the operating shaft of screw $e^2$ is made to revolve, is forced through the passageway $W^2$ into the digester A as will hereafter be more fully described. The purpose of the said extractor is not the extraction of oil or grease from the garbage, since uncooked garbage will give up little grease or oil, but the insertion of the garbage in the digester while the latter is under steam pressure. The water which is expressed from the garbage is drained off from the bed D which it has entered through drain plates $e^5$ and from the compartment $e^{11}$ through drain plate $d^2$ by pipes $P^4$, $P^4$, and $P^5$ to a hot water tank H, as will be explained, the said drain plate $d^2$ being at the entrance of said pipe $P^5$.

$E^2$ is a second extractor employed in the process, its office or purpose being that of the extractor in my above named patents; i. e., to extract the oil as well as water from the garbage which has been cooked in the digester as described in my above mentioned patent and conveying the tankage through the extractor to a hopper H' and then to the drying mechanism here marked Y'.

T', $T^2$, are trap tanks receiving water and oil from extractor $E^2$.

S' is a separator in which water and oil remain at the top while water and sediment go to the bottom, the said separating tank being heated by a steam coil in the bottom thereof to assure a melted and operative condition of the grease.

The offices and names of other essential parts of the apparatus employed will appear in a description of pipe and the apparatus; P', as before stated, is a pipe through which steam from the boiler system (not shown) is admitted to the bottom of the digester for cooking purposes. Compressed air from the same boilers is admitted through pipe here marked P' 2 and used in air compressor R, compressed air from which passes through pipe $P^2$ and suitable connections (some of which are lettered in the drawings, viz: $P^2$ 1, $P^2$ 2, $P^2$ 3, etc., and all are easily traced) to operate the valve mechanism of compressed air cylinder L' controlling, as will be explained, the entrance of garbage to and through passageway W' leading to extractor E'; valve mechanism of cylinder $L^2$ for operating plug valve $e^9$ of extractor E'; valve mechanism of cylinder $L^3$ for operating a ram to clear passageway $W^3$ of rags and similar substances, as described in my pending application, Se. No. 454,904, dated September 26, 1908; valve mechanism of cylinder $L^4$ to regulate the passage of cooked garbage and water from the digester A to extractor $E^2$; valve mechanism of cylinder $L^5$ to operate the plug valve of extractor $E^2$; the admission of said compressed air to the cylinders containing the said several valve mechanisms being controlled by hand levers $l'$, $l^3$, etc., as in most instances shown. Compressed air from said air compressor R is also used to force water through various pipes as will appear; $P^3$ is a pipe through which swill water is forced from swill water and muck tank K to hot water tank H by virtue of compressed air from said air compressor R admitted through pipe $P^2$ 5 to the muck tank K. $P^4$ and $P^5$ are, as before stated, pipes through which water passes from extractor E' to said hot water tank H.

G is a pump by which water is pumped from hot water tank H through pipe $P^6$ and a branch thereof $P^6$ 1 to the middle portion of the interior of the digester A, as shown, and through an extension of the same pipe $P^6$ to the passageway W' to moisten and accompany the raw garbage in its passage through the extractor E'.

$P^7$ is a pipe leading from the dome at the top of the digester to the bottom of the hot water tank H for the purpose of allowing gases and vapor generated in cooking the garbage to pass off to the bottom of the hot water tank H.

$P^8$ is a pipe in the dome of the digester, as shown, provided with a steam gage and a thermometer, and V' is a valve in pipe $P^8$ which the operator from time to time manipulates to open or close more or less by means of a suitable key so that the gas pressure in the digester shall not exceed the steam pressure. The steam and vapor thus escaping serve to heat the swill water in the hot water tank H that has been forced up from the swill water and muck tank K by compressed air pipe $P^2$ 5.

$P^9$ and $P^{10}$ are pipes through which water and oil pass by gravity from the extractor $E^2$ to the trap tank T'.

$P^{11}$ is a pipe leading from near the bottom of trap tank T' to a second trap tank $T^2$ about one-third way up said trap tank $T^2$. $P^{12}$ is a pipe leading from near the bottom of said trap tank T² to waste or sewer (not shown).

P¹³, P¹⁴ and P¹⁵ are pipes leading respectively from the bottom of trap tank T′, the bottom of trap tank T² and the bottom of the separating tank S′, to the swill water and muck tank K by which water and sediment may be drawn from such tanks to said muck tank, the said pipes P¹³, P¹⁴, P¹⁵ being each provided with a valve to be operated by hand as required. The said trap tanks and separator are made with conical bottoms to insure the emptying of their contents.

P¹⁶ is a pipe leading from about one-third way up the separator S′ to top of grease storage tank T³ from which a discharge pipe P¹⁷ leads from near the bottom through the top, as shown, for the discharge from the apparatus of the grease or oil obtained from the process, to shipping vessels through said discharge pipe P¹⁷ by compressed air entering said storage tank through a branch from compressed air pipe P², the said storage tank T³ being provided with a coil in the bottom, as shown, to heat the grease to a temperature at which it can be moved. Pipes P¹⁸ and P¹⁹ lead respectively from the domes of trap tanks T′ and T² to deliver to the separating tank S′, valves in said pipes P¹⁸ and P¹⁹ being opened from time to time when oil accumulates in said domes as shown by the glass indicators G′, G², the said oil flowing through said pipes P¹⁸ and P¹⁹ by gravity pressure; i. e., the mixed oil and water pass, as stated above, by gravity from extractor E² through pipes P⁹ and P¹⁰ to tank T′ and pipe P¹¹, and in turn the oil and water in pipe P¹¹ acts by gravity to force oil in the domes of the trap tanks through pipes P¹⁸ and P¹⁹. Pipes P²⁰, P²¹, P²² lead respectively from the tops of trap tanks T′, T² and separator S′ to carry off gases and vapor generated in said tanks and separator to a condenser H², whence when cooled said gases are discharged by a blower B² to pass to the smoke stack (not shown) in connection with the steam plant. The pipe P¹² leading from the swill water and muck tank K to the hot water tank H has in it a check valve V³ which opens when compressed air enters the said tank K. There is a corresponding check valve in a pipe (not shown) through which swill water is originally drained from the green garbage into the swill water and muck tank. Other steam and water pipes and branches are provided with ordinary valves represented in the drawings by conventions. Their operations will be readily understood, and only such as are mentioned in the description of the mode of operation are lettered in the drawings.

The apparatus having been thus described a brief description only will be required of the mode of operation. The extractor E′ being in operation, the screw e revolving therein and the plug valve e³ being on its seat, the operator manipulates hand lever l′ and opens the valve in pipe P⁶ where it enters passageway W′ causing raw garbage which continually arrives in the conveyer at the head of the apparatus to fall through passageway W′ into the extractor E′ where with the aid of water pumped up from the hot water tank H by steam pump G, it is forced by screw e² against plug valve e³ until a plug of garbage is formed. As before stated, fresh garbage does not give up its oil under pressure but the water admitted through pipe P⁶ is drained off through drain plates c² and d², and pipes P⁴ and P⁵ to hot water tank H while the garbage is passing through the extractor. In the mean time water from the hot water tank is caused by pump G to enter the digester A through pipe P⁶ up to the middle thereof which is under pressure from fresh steam admitted through pipe P′ and branches i, i. The operator now operates hand lever l² causing the plug valve e³ to open more or less, thereby permitting the plug of raw garbage in cylinder E′ to fall in a disintegrated condition into said digester, whence its further entrance is shut off, and the operation of the extractor is stopped. Fresh steam, however, continues to enter digester at a pressure of about 25 pounds and the cooking of the garbage is continued for an hour or two, or until the garbage is in a condition to give up its oil under pressure, the spent steam and gases passing off through pipe P⁷ in the dome of the digester.

An essential feature of the new process it may be well to here explain. The reason that the disintegrated plug of garbage has entered the digester against the steam pressure in the digester, as stated above, is because the pressure upon the garbage through cylinder E′ created by the screw on the plug is very considerably greater than the steam pressure in the digester. When the garbage in the digester is sufficiently cooked the operator manipulates hand levers l⁴ and l⁵ permitting the cooked garbage to form a plug in extractor E²; the operator finally by manipulating hand lever l⁶ opens the plug valve of cylinder E² and permits the disintegrated tankage to descend through the hopper H′ to the drier Y, the water and oil expressed from the cooked garbage in its passage through the extractor E² passing through drain plates (not shown) and pipes P⁹ and P¹⁰ to the trap tank T′, as indicated; and the extractor E′ being now again put in operation the process becomes continuous. It should be said, however, that water must be supplied to the garbage entering the extractor E′ as garbage is supplied; and likewise sufficient water must at all times be pumped into the digester to keep the garbage from burning, and to supply the necessary water for the proper working of extractor E². Oil will from time to time appear at the top of the hot water tank H, but under the pressure of water in the hot water tank will pass off through pipe $P^{23}$ to the separator S'. Glass indicators $B^4$ are set in the tops of the digester A, the hot water tank H to indicate the level of the contents of said vessels. $A^2$ is a portion of the top of an air tight casing of a conveyer used for bringing up garbage from the garbage vaults in the cellar to the top of the building in which the apparatus is located, plates or scrapers $a, a$, being attached to an endless sprocket chain and running in a trough with an opening O into which the scrapers (but 2 are shown) deliver the garbage.

With reasonable care exercised by a skillful operator the process above described is continuous. The solidity of the plug continuously formed in the extractor E' and forced into the digester A will be determined by the distance at which the operator keeps open the plug valve $e^9$ of extractor E' and by the supply.

The screw has unlimited power. It may be operated with a pressure, say, of 150 pounds to an inch. The compressed air in the cylinder $L^2$ should then have (the parts being proportioned as shown in the drawings) a pressure of about 70 pounds to an inch. The area of the plug valve is about four times that of the piston in cylinder $L^2$ and the leverage about doubles the effect of the pressure; the result being that the plug valve is operated at a pressure of about 35 pounds to an inch, at which pressure garbage is forced into the cylinder against a pressure of only 25 pounds. It is obvious, however, that these figures may be varied within reasonable limits.

I claim:—

1. The herein described process of extracting grease or oil from materials, the same consisting in continuously saturating the material with hot water and draining the hot water therefrom, continuously forcing the material so saturated and drained into a cooking vessel while said cooking vessel is under steam pressure, continuously adding hot water to said material in said cooking vessel and continuously cooking the material under said steam pressure, continuously removing the material in a cooked condition and oil and water therewith from said cooking vessel, and separating the oil and water from the material and the oil from the water.

2. The herein described process in the extraction of grease or oil from materials, consisting in continuously saturating the material with hot water, draining the hot water from the material and forcing the material so saturated and drained in a heated condition into a digester under steam pressure.

3. The herein described process in the extraction of grease or oil from materials, consisting in continuously saturating the material with hot water, draining the hot water from the material and forcing the material so saturated and drained in a heated condition into a digester under steam pressure, continuously adding hot water to said material in said cooking vessel and continuously cooking the material under said steam pressure.

4. The herein described continuous process of extracting grease or oil from materials, the same consisting in continuously saturating the material with hot water and draining the hot water therefrom, continuously forcing the material so saturated and drained into a cooking vessel while said cooking vessel is under steam pressure, continuously adding hot water to said material in said cooking vessel and continuously cooking the material under said steam pressure, continuously removing the material in a cooked condition and oil and water therewith from said cooking vessel, and separating the oil and water from the material and the oil from the water, the said water by which the material is saturated and by which it is cooked being supplied from water drained or separated from the material and oil in the continuous process.

In testimony whereof I affix my signature in presence of two witnesses.

CHARLES S. WHEELWRIGHT.

Witnesses:
WILLIAM W. SWAN,
IDA E. HANDREN.